United States Patent [19]

Martinson

[11] 4,360,881
[45] Nov. 23, 1982

[54] ENERGY CONSUMPTION CONTROL SYSTEM AND METHOD

[76] Inventor: John R. Martinson, 634 Stone Canyon, Los Angeles, Calif. 90024

[21] Appl. No.: 165,853

[22] Filed: Jul. 7, 1980

[51] Int. Cl.³ .................................................. H04B 7/00
[52] U.S. Cl. ..................................... 364/493; 364/483; 455/39; 340/825.69
[58] Field of Search ............... 364/493, 492, 464, 483, 364/514; 324/116, 142; 340/178, 695; 455/63, 42, 49, 53, 57, 66, 67, 39

[56] References Cited

U.S. PATENT DOCUMENTS

| | | | |
|---|---|---|---|
| 4,025,851 | 5/1977 | Haselwood et al. | 364/514 X |
| 4,077,061 | 2/1978 | Johnston et al. | 364/492 X |
| 4,117,537 | 9/1978 | Muench | 364/492 |
| 4,130,874 | 12/1978 | Pai | 364/492 X |
| 4,199,761 | 4/1980 | Whyte et al. | 455/39 X |
| 4,207,557 | 1/1980 | Gilkeson et al. | 364/483 X |
| 4,213,182 | 7/1980 | Eichelberger et al. | 364/493 |
| 4,217,646 | 8/1980 | Caltagirone et al. | 364/493 |
| 4,218,737 | 8/1980 | Buscher et al. | 364/493 |
| 4,222,118 | 9/1980 | Dickinson et al. | 364/514 X |

*Primary Examiner*—Edward J. Wise

*Attorney, Agent, or Firm*—Lewis Anten

[57] ABSTRACT

An energy consumption control system and method for use by a utility company for reducing energy consumption during peak hours of demand. The system includes a centralized code signal generator for selectively generating one or more distinguishable control codes, a multiplexer for impressing these control codes upon the carrier of an existing commercial broadcast station, and a plurality of radio receivers each stationed at a selected customer location for disconnecting selected appliances upon receipt of one of said control codes. Each receiver includes a signal detector for detecting the reception of one of said control codes and a disconnect switch for disconnnecting selected appliances of the customer upon detection of one of said control codes. A timer may be used for sustaining the operation of the disconnect switch after detection of one of said control codes for a predetermined period of time. Alternatively, a latching relay on microprocessor scheme may be used in which case the appliance will remain disconnected until the transmission of a second control code is detected.

The system is disclosed as useful for controlling gas or water as well as electrical energy consumption.

5 Claims, 4 Drawing Figures

ENERGY CONSUMPTION CONTROL SYSTEM AND METHOD

BACKGROUND OF THE INVENTION

This invention relates to energy consumption control systems which reduce energy consumption during peak hours of demand by causing selected energy consumming appliances to automatically disconnect themselves from their supply of energy.

In the past, energy consumption control systems have been designed for use with electrical energy supply systems as illustrated by U.S. Pat. Nos. to Anderson, et al. (3,946,243) and Conde, et al. (4,152,605). These systems, however, rely exclusively upon the imposition of signal distortions on the electrical energy supply line to effectuate cut-off control. Unfortunately, not only are such systems not readily adaptable to controlling consumption of non-electrical energy sources such as gas, but they would not be compatible with energy consumming appliances which require an undistorted source of electrical energy supply to properly operate. Thus, these energy consumption control systems are not seen as capable of providing an adequate solution to the general problem of energy consumption control.

Although the Detroit Edison Company has been using for some years FM radio signals to remotely control the operation of water heaters (as evidenced by the IEEE Transmission and Distribution Committee of the IEEE Power Group recommended paper entitled "Radio Control of Water Heaters and Distribution Station Voltage Regulators," available for printing on Apr. 15, 1969), this system requires the installation of expensive FM radio transmitters and antennae. Moreover, this system requires the FCC to dedicate to the utility a separate segment of the radio communication band, thus further crowding this already heavily used means of communication.

OBJECT AND SUMMARY OF THE PRESENT INVENTION

It is an object of the present invention to obviate these and other problems in the prior art.

Another object of the present invention is to provide an energy consumption control system which can control the energy consumption of a large distribution system.

Another object of the present invention is to provide an energy consumption control system which operates without causing distortions in the energy supply line.

Another object of the present invention is to provide an energy consumption control system which does not require the installation of a costly centralized transmitting facility.

Another object of the present invention is to provide an energy consumption control system which has the flexibility to additionally or alternatively function as an energy conservation control system.

Another object of the present invention is to provide an energy consumption control system which is readily adaptable to the control of gas or water as well as electrical energy consumption.

These and still further objects of the invention are achieved by utilizing the already built and operating transmitting facilities of existing commercial broadcast stations to broadcast control codes which, upon reception, effectuate a temporary removal of selected energy consumming appliances from their source of energy supply. In this way, widespread control over energy consumption can be effectuated without the need for errecting costly transmitting facilities and without wasting valuable communication channels or placing distortions on the energy supply line.

In the preferred embodiment of the invention a high degree of flexibility in control is achieved by providing a code signal generator which can selectively generate any one or more of a plurality of distinguishable control codes. Each receiving station is then tuned to any one or perphaps a few of the distinguishable control codes. This results in the ability to selectively control certain energy consuming appliances at one time of the day and others at another time.

In the prefered embodiment of the invention, the 67 khz Sub-Carrier Authorization ("SCA") channel of a FM broadcast station is used to carry the control code information.

DETAILED DESCRIPTION OF THE PREFERRED EMBODIMENT

Figure 1:
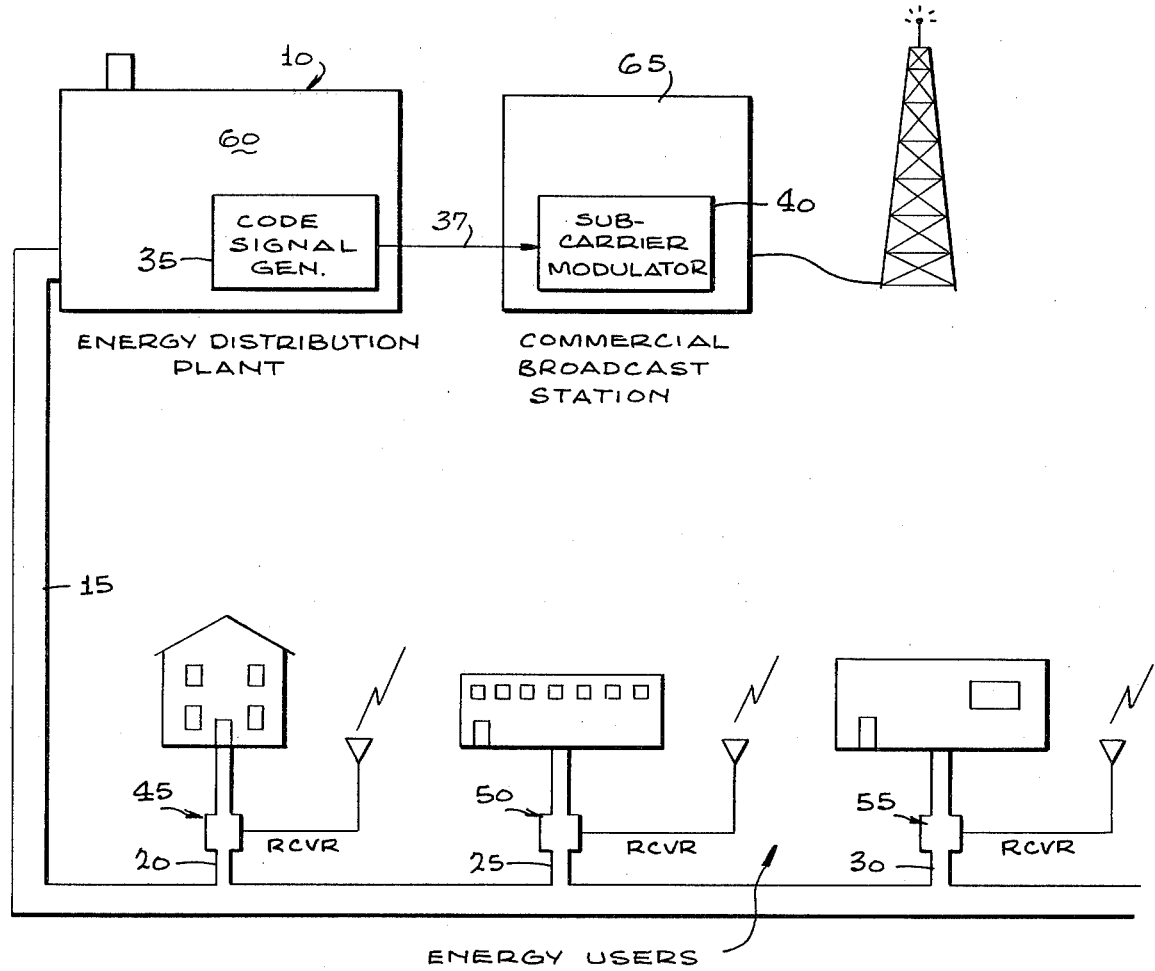
FIG. 1 illustrates the energy consumption control system of the present invention operating in conjunction with a conventional energy distribution system.

The energy consumption control system of the present invention is illustrated in FIG. 1 operating in conjunction with a conventional energy distribution system. As shown in FIG. 1, the conventional energy distribution system includes energy distribution plant 10, central energy distribution line 15, individual customer distribution lines 20, 25 and 30, and a plurality of energy consumming appliances such as water heaters, refrigerators and other appliances (not shown) located within the facilities of the energy users. The distributed energy may be of any type such as water, gas or electricity.

To adapt the energy consumption control system of the present invention to the conventional energy distribution system requires a minimum of additional equipment. In particular, and also as shown in FIG. 1, all that is needed is centralized code signal generator 35, sub-carrier modulator 40, and a plurality of receivers, such as receivers 45, 50 and 55.

Code signal generator 35 is designed according to conventional techniques to generate upon command one or more unique distinguishable control codes. Although code signal generator 35 is illustrated as contained within energy distribution plant 60, such a location is not a necessary requirement. It may be placed, for example, in commercial broadcast station 65 or at any other convenient location.

The output from code signal generator 35 is connected via connection link 37 to sub-carrier modulator 40 located within commercial broadcast station 65. Connection link 37 can utilize any of the well-known wire or wireless transmission techniques. The purpose of sub-carrier modulator 40 is to impress the information generated by code signal generator 35 upon the carrier of commercial broadcast station 65.

In the preferred embodiment of applicant's invention, commercial broadcast station 65 is an FM broadcast station transmitting a 67 khz Sub-Carrier Authorization ("SCA") channel. This embodiment is especially advantageous as "SCA" channels, once authorized by the FCC, are available for general usage without the need for any specific FCC approval.

In this embodiment, each distinguishable control code generated by code signal generator 35 consists of a distinct pair of audio tones. For maximum compatibility, the multi-frequency tone set ("MF") used by the telephone company for long-distance switch signaling, should be used. This information is then multiplexed by sub-carrier mudulator 40 on the "SCA" channel. An "SCA generator" should preferably be used for this purpose. To insure compliance with FCC bandwidth requirements, a 5 khz low pass filter with a roll-off of at least 25 db/decade, should be inserted in a well known manner at some point in connection link 37.

Other already existing carriers can also be used to transmit the control code information. Examples of such carriers are the 19 khz "pilot" carriers which are used to designate stereo FM broadcasts, omnidirectional microwave carriers, TV carriers, TV broadcast channels, SCA on TV broadcast channels, FM injected on AM carriers, and FSK injected on AM or FM carriers.

Each energy consumming appliance or group of appliances to be selectively disconnected is connected to a receiver which is designed to receive the control codes transmitted by commercial broadcast station 65. Although the receiver normally used by the customer to receive programming material transmitted by commercial boradcast station 65 may be used as the receiver for the energy consumption control system, in the preferred embodiment of applicant's invention, applicant chooses to use a separate receiver mounted "in-line" with the appliance to be controlled dedicated for this purpose. Such a dedicated receiver would be significantly less expensive than a standard commercial FM broadcast receiver since it would only have to be capable of receiving the signal transmitted by commercial broadcast station 65 and detecting the transmission of one or a few of the control codes. Moreover, since it could simply be plugged "in-line," the receiver could be sold as a separate unit and no costly modifications to the building structure housing the energy consumming appliance need be made.

Figure 2:
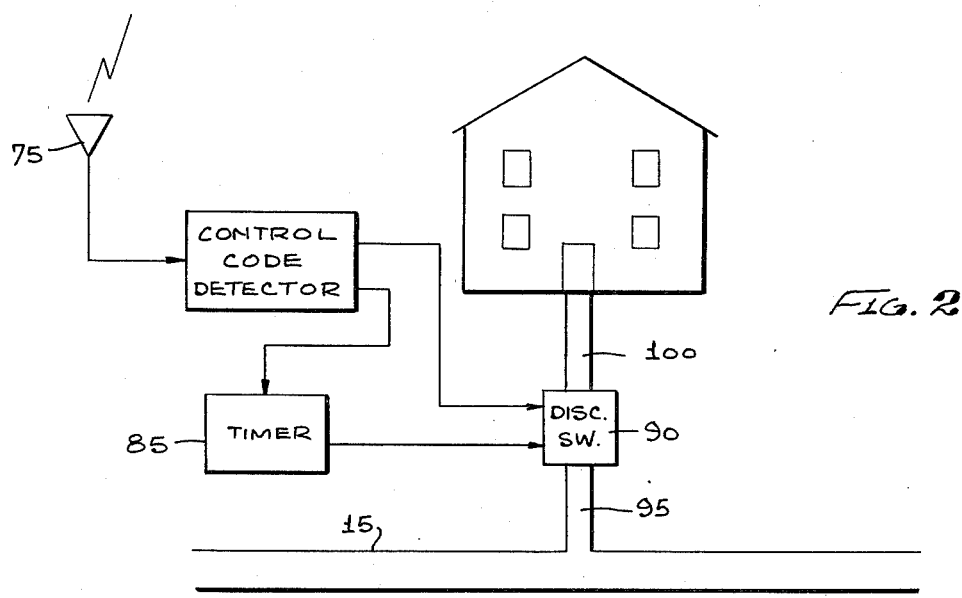
FIG. 2 illustrates a preferred embodiment of the receiving means of the present invention.

A more detailed description of such a receiver is shown in FIG. 2. Antenna 75 is designed to receive the radio signal transmitted by commercial broadcast station 65. Connected to antenna 75 is control code detector 80 which detects the transmission by commercial broadcast station 65 of one or a few of the control codes.

Upon detection of a control code, disconnect switch 90 and timer 85 are activated. Activation of disconnect switch 90 causes energy supplied from main supply line 15 through individual customer line 95 to be cut-off from selected appliances (not shown) by preventing its flow through individual customer line 100. To maintain the cut-off of energy supply, timer 85 is provided. Once activated, timer 85 serves to prevent the reconnection of energy supply line 95 to supply line 100 for a predetermined amount of time after detection by control code detector 80 of one of the control codes. Thus, timer 85 eliminates the necessity for the centralized code signal generator 35 to transmit a subsequent reconnect command signal.

A remarkable degree of flexability can be achieved in the control of energy consumption by strategically connecting receivers of the same type, i.e. receivers designed to detect the transmission of the same distinguishable control code or codes, to defined groups of energy consuming appliances. Then, by selectively transmitting different distinguishable control codes at different times of the day (or week), the energy consumed by different defined groups of energy consuming appliances can be controlled. The appliances may be grouped, for example, by their type, e,g., water heaters, freezers, air conditioners, etc.; by their users, e.g., residential, commercial, industrial, educational, etc.; by their geographic location within the broadcast area; or by a combination of these methods.

Figure 3:
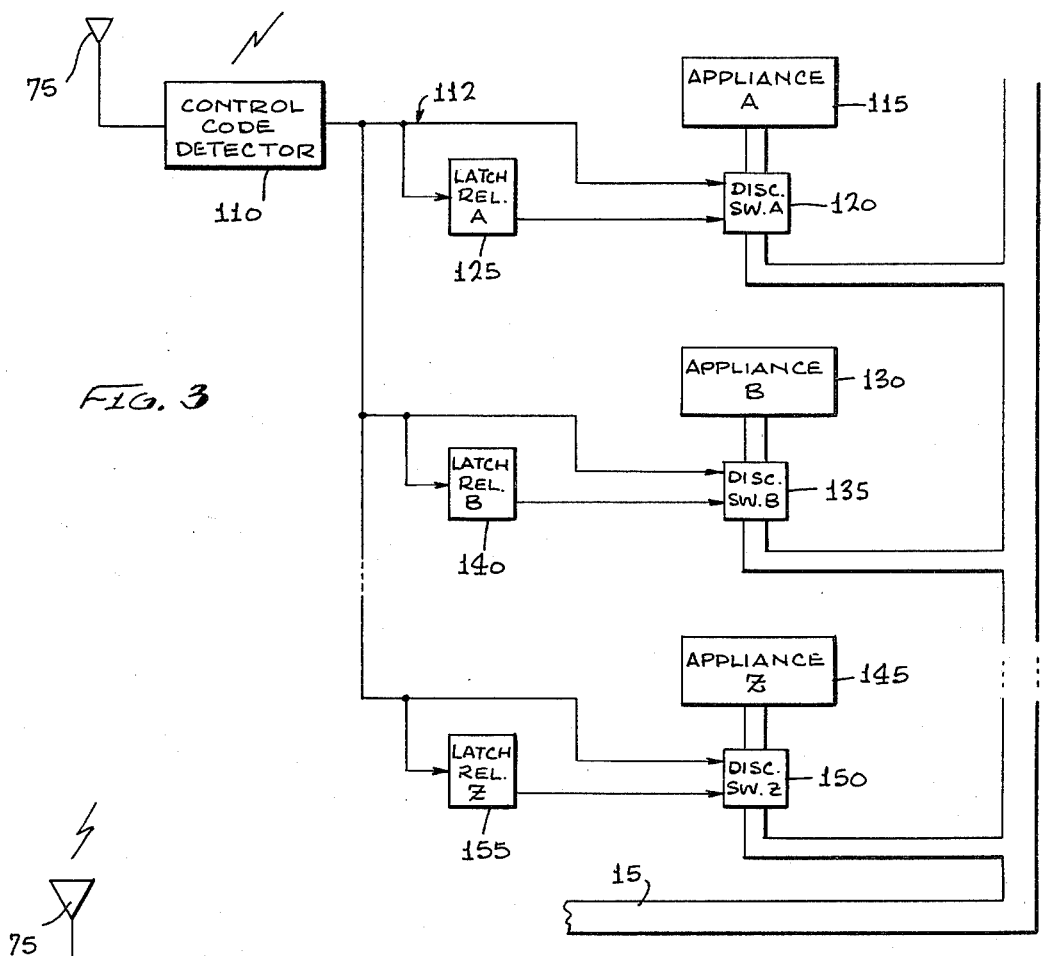
FIG. 3 illustrates a preferred embodiment of the receiving means of the present invention adapted to permit independent control of a plurality of different appliances.

Still further flexibility can be achieved by connecting a plurality of disconnect switches and associated latching relays (or timers) to a single control code detector as shown in FIG. 3. In this embodiment, control code detector 110 is connected by common communication link 112 to a plurality of disconnect switches and associated latching relays. Instead of signaling each disconnect switch and associated latching relay simultaneously, however, control code detector 110 is designed in a well known manner to send separately recognizable signals over communication link 112 in response to the reception of certain defined control codes. Disconnect switch A (120) and latching relay A (125) are designed in a well known manner to respond only to one of the separately recognizable signals sent by control code detector 110 while the remaining disconnect switches and associated latching relays (i.e. 135, 140, 155 and 150) are designed to respond, respectively, to other separately recognizable signals. In this way, a plurality of appliances at a single customer location can be separately controlled by code signal generator 35 by merely using a single control code detector. This effectuates an obvious cost advantage by eliminating the need for a separate control code detector for each disconnect switch.

Figure 4:
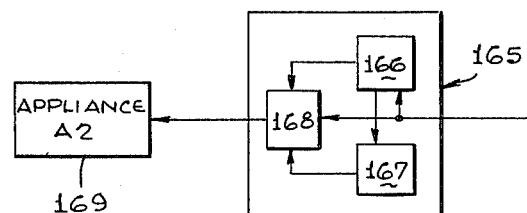
FIG. 4 illustrates the preferred embodiment of the receiving means illustrated in FIG. 3 wherein a power line is used as the communication link between components of the receiver.

For maximum flexibility in an electrical energy consumption control system, communication link 112 is preferably the standard power line 113 as shown in FIG. 4. In this embodiment, power line modulator 111 is connected to output 112 of control code generator 110 and is designed to impress the output from control code detector 110 on the power line utilizing well known high frequency modulation techniques.

The signal to each disconnect switch/latching relay unit is then demodulated from power line 113 by a separate power line demodulator circuit (see e.g., 161, 165 and 171) in accordance with well known demodulation techniques.

When using the power line as the communication link, each disconnect switch, latching relay, and power line demodulator circuit can be assembled in a single plug-in module. Thus, merely by plugging in a module, such as modules 160, 165 or 170 in FIG. 4, between the appliance to be controlled and the power source, a wide diversity in control can easily be effectuated. This is because of the ability of the plug-in module to receive a separately recognizable signal over the very power line used to power the appliance to be controlled.

The flexibility inherent in the above described system of FIG. 3 is obvious. By designing control code detector 110, for example, to receive and re-transmit 5 separately identifiable control signals, 5 channels of control can be effectuaed. Not only is the flexibility of such a system enhanced because of the absence of a need to use all 5 channels, but it is equally permissible to place many energy consuming appliances in different locations on the same channel. All that is needed is to plug the proper in-line module between the appliance to be controlled and its source of electrical supply. Thus, as shown in FIG. 4, channel "A" is used to control appliances A1 or A2 while channel "Z" is used to independently control appliance Z1.

Although selective generation of the control codes may be effectuated by manual operator control, automatic means, such as a time-controlled computer may also be utilized. Such means would be designed to effectuate selective generation of the control codes in accordance with a predetermined time pattern and/or the current energy demand.

In a second embodiment of the present invention a latching relay is used in place of timer 85. The relay is designed to latch upon detection of one or a few of the control codes and unlatch upon the subsequent detection of another or the same control code. This embodiment is particularly useful as it allows changes to be made in the disconnect time merely by reprogramming the time-controlled computer. A costly visit to the customer's location to change his timer module would not be required. A microprocessor scheme may also be used for this purpose.

In addition to advantageously reducing energy demand during peak hours of operation, the present invention can also be advantageously used to actually reduce energy consumption over a prolonged period of time. One way of accomplishing this result is to selectively disconnect appliances during a period of time when the benefits from their usage are not likely being enjoyed. For example, at night refrigerated food is often maintained at an unnecessarily low temperature. Thus, by disconnecting refrigerators during some period of the night, a permanent reduction in the amount of energy consummed will result.

To encourage installation of receivers by customers, a discount in his cost of electricity may be offered. The discount may be made proportional to the amount and type of apliances which the receiver is allowed to control.

Although a preferred embodiment of the invention has been disclosed, the scope of the invention to which protection is claimed is delineated solely by the following claims:

I claim:

1. An electrical energy consumption control system for controlling the input of electrical energy to a plurality of electrical energy consuming appliances comprising for each appliance power circuit:
   (a) control generating means for selectively generating at least two distinguishable control codes;
   (b) a time-controlled computer for automatically controlling the generation of said control codes by said control generating means;
   (c) modulation means for impressing said control codes on sub-carrier of broadcast station;
   (d) receiving means mountable "in-line" with an energy consuming appliance for receiving said sub-carrier, said receiving means comprising further:
      (1) means for detecting the reception of said control codes;
      (2) electrical power disconnecting switch means connected to said detecting means for disconnecting said appliance from its source of electrical energy supply upon detection by said detecting means of one of said control codes; and
      (3) latching means for maintaining the energy consumption device disconnected from its source of energy supply for a predetermined period until another control code is detected by said detecting means.

2. The control system of claim 1 wherein said modulation means impresses said control code on the 67 Khz SCA channel of an FM broadcast station.

3. The control system as in claim 2 in which said latching means comprises a timer for holding the disconnect switch open for a predetermined period of time following activation by detection of said control codes whereby the necessity for a centralized code signal system for reconnection command is eliminated together with the problems created by simultaneously turning on a large plurality of appliances of the system at the same time.

4. An energy consumption control system for controlling the input of energy to an energy consuming device comprising:
   (a) control generating means for selectively generating a plurality of control codes;
   (b) modulation means for impressing said control codes upon a radio transmission carrier which is also used to carry other information or data, said modulation means operating without interfering with the transmission or reception of the other information or data;
   (c) receiving means for receiving said carrier, said receiving means comprising:
      (1) detecting means for detecting the reception of said control codes and for generating at least one separately recognizable signal in response to the reception of at least one predetermined control code; and
      (2) power disconnecting means connected to said detecting means for disconnecting an energy consuming appliance from its source of energy supply upon reception of at least one of said separately recognizable signals;
   (d) said receiving means further includes power line modulation means connected to said detecting means for impressing said separately recognizable signals on an electrical power line; and power line demodulation means connected to said disconnecting means for removing said impressed recognizable signals for the power line signal and for delivering said removed recognizable signal to said disconnecting means; and
   (e) said disconnecting means are contained within a single module which can be inserted in series into the power line to an energy consuming appliance for disconnecting the appliance on receipt of a predetermined control code.

5. The control system as in claim 4 in which said latching means comprises a timer for holding the disconnect switch open for a predetermined period of time following activation by detection of said control codes whereby the necessity for a centralized code signal system for reconnection command is eliminated together with the problems created by simultaneously turning on a large plurality of appliances of the system at the same time.

* * * * *